United States Patent [19]

Shtarkman

[11] Patent Number: 4,509,730
[45] Date of Patent: Apr. 9, 1985

[54] FLEXIBLE WALL SPRING DAMPER

[75] Inventor: Emile M. Shtarkman, Euclid, Ohio

[73] Assignee: Imperial Clevite Inc., Glenview, Ill.

[21] Appl. No.: 436,330

[22] Filed: Oct. 25, 1982

[51] Int. Cl.³ .............................................. F16F 13/00
[52] U.S. Cl. ..................... 267/35; 188/268;
267/64.25; 267/64.27; 267/140.1; 267/140.3;
267/141; 267/152; 267/153; 267/122; 280/662;
280/697; 280/712; 280/716
[58] Field of Search ................... 188/268; 267/35, 152,
267/140.3, 141, 140.1, 153, 64.25, 64.27, 122;
280/697, 662, 712, 716

[56] References Cited

U.S. PATENT DOCUMENTS

| 871,186 | 11/1907 | Rosenzweig | 267/35 |
|---|---|---|---|
| 1,886,712 | 11/1932 | Messier | 188/268 |
| 2,460,116 | 1/1949 | Bazley | 188/268 X |
| 3,121,479 | 2/1964 | Dillenburger et al. | 188/268 X |
| 3,130,965 | 4/1964 | Niclas | 267/64.27 |
| 3,160,407 | 12/1964 | Vaugoyeau | 267/141 X |
| 3,380,557 | 4/1968 | Peterson | 188/268 X |
| 3,424,448 | 1/1969 | Chak Ma | 267/35 |
| 3,687,440 | 8/1972 | Jarret et al. | 267/141 |
| 3,897,856 | 8/1975 | Pineau | 267/140.3 X |
| 4,005,858 | 2/1977 | Lochner | 267/136 |
| 4,011,929 | 3/1977 | Jeram et al. | 188/268 |
| 4,052,088 | 10/1977 | Nicholls | 280/708 |
| 4,401,298 | 8/1983 | Eaton et al. | 262/140.1 |

FOREIGN PATENT DOCUMENTS

| 137271 | 8/1979 | Fed. Rep. of Germany . | |
|---|---|---|---|
| 760 | of 1898 | United Kingdom | 267/64.27 |
| 971795 | 11/1964 | United Kingdom . | |
| 1152526 | 5/1969 | United Kingdom . | |
| 2004349 | 3/1979 | United Kingdom . | |
| 1601444 | 10/1981 | United Kingdom . | |

Primary Examiner—George E. A. Halvosa
Attorney, Agent, or Firm—Russell E. Baumann

[57] ABSTRACT

A flexible wall spring damper including opposed first and second rigid mounting members interconnected by a flexible side wall is provided. A spring damper chamber is included within the flexible wall and is interposed between the opposed rigid mounting members. A plurality of elastomeric particles are included in the damper chamber. A selectively pressurizable gas chamber is interposed between the rigid mounting members and the flexible side walls. In one embodiment of the invention, a flexible diaphragm connected to one of the rigid mounting members defines the selectively pressurizable gas chamber. In another embodiment of the invention, a spiral tube defines the flexible side wall and includes an inner chamber including the plurality of elastomeric particles. Relative movement between the opposed rigid mounting members operates to stress the flexible side wall and the plurality of elastomeric particles, and vary the volume of the selectively pressurizable gas chamber. The invention exhibits the operational characteristic of a constant natural frequency independent of the mass supported by the device.

15 Claims, 3 Drawing Figures

FLEXIBLE WALL SPRING DAMPER

BACKGROUND OF THE INVENTION

The present invention relates generally to load carrying shock absorbers. More particularly, it relates to shock absorbers of the type which are mounted to vehicles and which use both an elastomeric spring and a selectively pressurizable gas chamber for carrying and leveling load, absorbing shock, and energy dissipation. However, it will be appreciated by those skilled in the art that the invention can be readily adapted for use in other environments as, for example, where similar spring dampening devices are employed to protect or cushion other items.

Known spring damper devices of the type described have included elastomeric shear springs, elastomeric diaphragms, selectively pressurizable gas chambers and associated communicating fluid chambers including restrictive orifice means therebetween for restricting the flow of fluid between the fluid chambers. Such a spring dampening device is described in Application Ser. No. 208,013, filed Nov. 18, 1980, now abandoned, in the name of Shtarkman et al and assigned to the assignee of the subject application. In the Shtarkman et al application an expandable and contractable elastomeric bladder for separating a gas chamber from a fluid chamber in a viscous spring damper is provided. Varying the pressurization of the gas chamber is employed for varying the spring rate of the viscous spring damper, calibrating the damper or leveling a load supported thereby. In addition, fluid flow between the communicating fluid chambers absorbs and dampens the shock and spring forces occurring during operation of the device. Such a structure provides the advantageous operating characteristics of both a spring and a shock absorber in one package.

A particular problem inherent in viscous spring dampers including fluid chambers is the limitation of a short stroke. In other words, the extent of compressive reduction of the spring damper device may be unduly limited because the volume of fluid that must be displaced between communicating fluid chambers may become too great to allow compressive reduction of the device to a desired level. There may simply not be enough room for the fluid, which is typically an incompressible hydraulic fluid, to be displaced. As a result, failure of the viscous spring damper would occur upon compression of the device beyond a certain level, either occurring through fracture of the device's housing or shear spring, or through shear spring bond failure.

Another problem with prior viscous spring dampers is instability of the spring characteristics upon excessive deflection of the device. Specifically, an elastomeric shear spring is stressed primarily in shear upon deflection of a viscous spring damper. However, in situations where the viscous spring damper is stroked or compressed beyond a point where the shear spring becomes unstable, the shear spring operates irregularly. On a load/deflection curve, this is manifested as a drop in load with increasing deflection, rather than a steady increase in load with increasing deflection. Once in this position, it is difficult for the spring to expand or "flip back" rapidly. Such difficulty further results in slow response in the operation of the viscous spring damper.

Yet another problem with prior viscous spring dampers is that the natural frequency of spring response is dependent upon the mass supported by the device. When employed in a vehicle suspension system, a non-constant natural frequency device translates into rider discomfort as a vehicle becomes loaded.

The present invention contemplates a new and improved dry viscous spring damper which overcomes all of the above referred to problems and others to provide a new viscous spring damper which is simple in design, economical to manufacture, readily adaptable to a plurality of load carrying and shock absorbing uses, and which provides improved shock absorption and energy dissipation.

BRIEF SUMMARY OF THE INVENTION

In accordance with the present invention, there is provided a flexible wall spring damper including opposed first and second rigid mounting members interconnected by a flexible side wall for defining a flexible wall spring damper chamber. A plurality of elastomeric particles are included in the damper chamber. Relative movement between the opposed rigid mounting members operates to stress the flexible side wall and the plurality of elastomeric particles.

In accordance with another aspect of the present invention, there is provided a flexible wall spring damper including opposed first and second rigid mounting members interconnected by a flexible side wall for defining a flexible wall spring damper chamber. A plurality of elastomeric particles are included in the damper chamber. A flexible diaphragm is connected to the second rigid mounting member and comprises a selectively pressurizable gas chamber. Relative movement between the opposed rigid mounting members operates to stress the flexible side wall, the plurality of elastomeric particles and vary the volume of the gas chamber.

In accordance with another aspect of the present invention, the plurality of elastomeric particles have particle sizes of 30 mesh or smaller and further have a preferred aspect ratio of essentially 1 and highly irregular surfaces.

In accordance with a further aspect of the invention, the spring damper chamber further includes agglomeration inhibitors such as polytetrafluoroethylene particles, silica powders and silicone oil.

In accordance with the present invention, there is provided a spiral dry viscous spring damper including opposed rigid mounting members and an elastomeric spirally configured connecting member therebetween. The connecting member comprises a first spirally configured tube including a first plurality of tube windings and including a tube inner chamber. A plurality of elastomeric particles are included in the inner chamber. Relative movement between the rigid mounting members operates to stress the sprirally configured tube and the plurality of elastomeric particles.

In accordance with another aspect of the present invention, a selectively pressurizable elastomeric member is interposed between the mounting members and within the plurality of tube windings. At least one of the mounting members includes valve means for pressurizing the elastomeric member. The elastomeric member preferably comprises a second spirally configured tube including a second plurality of tube windings disposed within the first spirally configured tube.

One benefit obtained by use of the present invention is a flexible wall spring damper having improved operating characteristics.

Another benefit obtained from the present invention is an improved flexible wall spring damper having a plurality of elastomeric particles received in a spring damper chamber for load carrying and leveling, shock absorption, dampening and energy dissipation.

Another benefit obtained from the present invention is a flexible wall spring damper which provides significantly longer stroke of operation with improved load versus deflection stability and improved spring response.

Yet another benefit obtained from the present invention is a flexible wall spring damper which exhibits a constant natural frequency generally independent of the mass supported by the device.

Other benefits and advantages for the subject new flexible wall spring damper will become apparent to those skilled in the art upon a reading and understanding of the specification.

BRIEF DESCRIPTION OF THE DRAWINGS

The invention may take physical form in certain parts and arrangement of parts, the preferred and an alternative embodiment of which will be described in detail in the specification and illustrated in the accompanying drawings which form a part hereof and wherein.

DETAILED DESCRIPTION OF THE INVENTION

Figure 1:
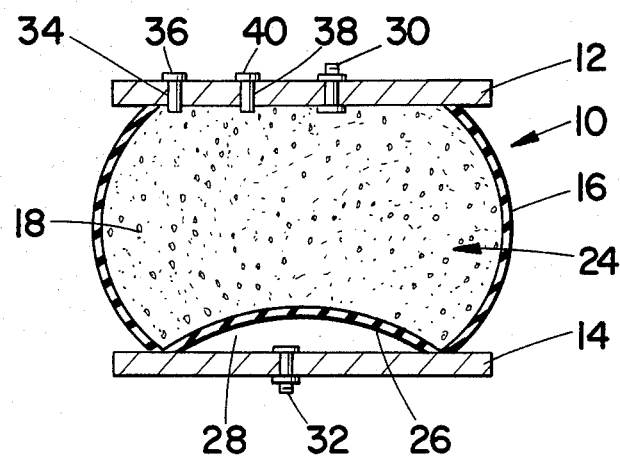
FIG. 1 is a cross-sectional elevational view of a preferred embodiment of a flexible wall spring damper constructed in accordance with the present invention.

Referring now to the drawings wherein the showings are for purposes of illustrating the preferred and an alternative embodiment of the invention only and not for purposes of limiting same, FIG. 1 shows a flexible wall spring damper 10 including a first rigid mounting member 12 and an opposed second rigid mounting member 14. The rigid mounting members are interconnected by a flexible side wall 16 which includes a flexible wall spring damper chamber 18. Included in the damper chamber 18 is a plurality of elastomeric particles 24 and a flexible diaphragm 26. Diaphragm 26 is connected to the second rigid mounting member 14 and may be an integral part of flexible side wall 16. A selectively pressurizable gas or air chamber 28 is interposed between the second rigid mounting member 14 and the diaphragm 26. Conventional valve means 30,32 are included in first and second mounting members 12,14 respectively to provide the supply of air or gas to spring damper chamber 18 and gas chamber 28. A sealable filler port 34 is included in first mounting member 12 for the ingress and egress of elastomeric particles 24 to the spring damper chamber 18. A port plug 36 (or valve) is employed to seal the port 34. A sealable gas filter 38 is also included in first mounting member 12 for the filtered egress of gas or air from spring damper chamber 18. Gas filter 38 may be conventionally sealed with a filter plug 40 (or a valve).

The flexible wall spring damper 10 has an overall generally cylindrical configuration and is preferably employed in a vehicle suspension system to carry and level load, absorb shock and dissipate energy.

It is a particular feature of the invention that spring damper chamber 18 includes a plurality of solid elastomeric particles 24 to be particularly useful as the working medium for the invention which are essentially incompressible in volume. Elastomeric particles 24 may be constructed of various elastomeric substances, preferably a natural rubber compound with a Shore A hardness range of 45 to 70, with an elongation-at-break of at least 500%, and with a carbon black loading such that the hysteretic properties are in the range of those normally used in automotive bushing compounds; and preferably comprise particles having a particle size of 30 mesh or smaller. The particles must be so sized that they act as a system of individual particles. At a particle size of 30 mesh or smaller, this occurs. Such a size range is best suited for employment in a spring damper device of the type of the invention. It is also preferred that the particles have an aspect ratio of essentially 1 and have highly irregular surfaces.

Maintaining the individuality of the particles 24 is important to the proper functioning of the invention. If the particles become agglomerated, it has been found that performance suffers. Therefore, additives have been utilized to inhibit agglomeration. Such additives tend to coat the particles and not remain free in the main chamber 18. Particulate additives such as polytetrafluoroethylene powder and various types of silica which coat the elastomeric particles and have a mean particulate size much smaller than the elastomeric particles have been found to be particularly useful. Alternatively, a liquid additive, such as silicone oil, may also be employed. In addition, a thin film deposit from a gas could also be utilized.

Because the medium of chamber 18 is a plurality of elastomeric particulates 24, packing efficiency is such that there are spaces between the individual particles. For non-compacted elastomeric particles with highly irregular surfaces, the particles may occupy less than 25% of the fill volume of chamber 18. The balance of the volume of chamber 18 may be a vacuum, or be filled with air or other gases such as nitrogen.

The medium of elastomeric particles provides both a spring rate and a dampening capacity for the invention. The complex interactions of the particles which cause deformation of individual particles and movement of the particles relative to each other are what produces these behavior chacteristics. The spring and dampening rates can be tailored through appropriate choices of elastomeric particle types, sizes and shapes.

Spring damper chamber 18 may be completely filled with elastomeric particles as shown or could be only partially filled. However, when only partially filled, there must be sufficient elastomeric particles present in aggregation to fill the spring damper chamber upon relative movement between the mounting members 12,14 to an extent to dispose the members 12,14 in an equilibrium position upon being subjected to a static load.

Figure 2:
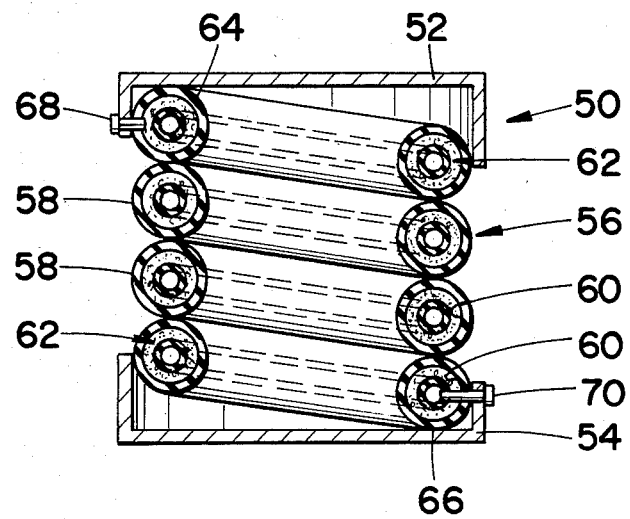
FIG. 2 is a cross-sectional elevational view of an alternative embodiment of a flexible wall spring damper constructed in accordance with the present invention comprising a spiral dry viscous spring damper; and, FIG. 3 is a graph showing the deflection characteristics of the present invention.

With particular reference to FIG. 2, an alternative embodiment of the invention is shown. The alternative embodiment of a flexible wall spring damper comprises a spiral dry viscous spring damper 50 including a first rigid mounting member 52 and an opposed second rigid mounting member 54. A flexible wall connecting member 56 is interposed between mounting members 52,54 and preferably comprises a first spirally configured tube including a first plurality of tube windings 58 and an inner chamber 60 extending the length of the spirally configured tube. A plurality of elastomeric particles 62 are included in inner chamber 60. Particles 62 are identical to the elastomeric particles employed in the embodiment of the invention of FIG. 1. A first end portion 64 of the spiral tube, contiguous to the first rigid mounting member 52, is bonded to the member 52 and a second end portion 66 of the spiral tube, contiguous to the second rigid mounting member, is bonded to the second member 54. Conventional port means 68,70 are provided for supplying the elastomeric particles 62 and selective gas pressurization to the inner chamber 60. The plurality of tube windings 58 of the spiral tube are disposed to form a generally cylindrical configuration and bonded together at abutting portions. It is also within the scope of the invention to include a selectively pressurizable elastomeric member (not shown) interposed between the mounting members 52,54 and within the plurality of tube windings 58. At least one of the mounting members would necessarily include additional valve means for pressurizing the elastomeric member. Preferably, the selectively pressurizable elastomeric member comprises a second spirally configured tube including a second plurality of tube windings disposed within the first spirally configured tube.

In addition, and with specific reference to FIG. 1, the benefits of the present invention will be realized if the diaphragm 26 is removed from the device illustrated therein. That is, while it is preferred to utilize a diaphragm in the device of the invention, such a diaphragm is not necessary to obtain a device having improved operational characteristics.

It will be readily apparent to those skilled in the art, however, that modification may be made to the structural details of the new flexible wall spring damper as described herein to accommodate particular operational needs and/or requirements. Such changes are not deemed to affect the overall intent or scope of the present invention.

OPERATION

Figure 3:
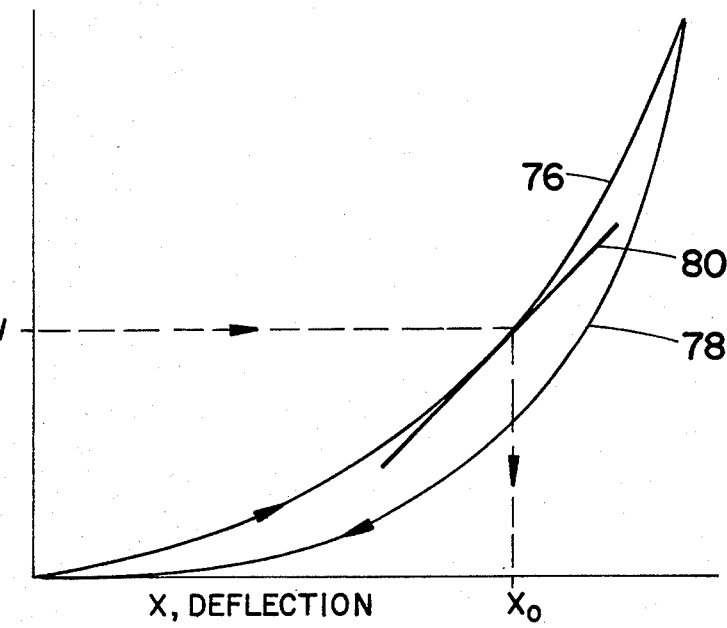

With particular attention to FIGS. 1-3, the improved operational characteristics of the new flexible wall spring damper will be specifically discussed.

The invention is a combination spring/damper in that it provides the characteristics of both a spring and a shock absorber in one package. Relative movement between the rigid mounting members 12,14,52,54 of the embodiments of the invention operates to stress the flexible side walls 16,56 and the plurality of elastomeric particles 24 and further operates to vary the volumes of the selectively pressurizable gas chambers 28. All these actions combine in operation to absorb the shock and/or support the load applied to the spring damper 10,50. The employment of the elastomeric particles presents a substantial improvement over prior art viscous spring dampers and particularly those viscous spring dampers that employed hydraulic fluids for dampening spring responses to shocks. One particular improved feature of operation is that for a given spring damper size, a significantly longer stroke can be realized with the structure of the present invention as opposed to a structure containing hydraulic fluids. More specifically, the system of a plurality of elastomeric particles may compress where hydraulic fluid will not, thus allowing the present invention to be compressed at a point at which a prior art spring damper would fracture its housing or shear spring or fail at a shear spring bond, thereby releasing fluid. Another operational characteristic and advantage of the present invention is one of improved stability. Since the elastomeric shear springs of a typical prior art viscous spring damper are stressed primarily in shear during operation and shock absorption, instability can occur when the shear spring is stroked too far or "over center". In such an instance, spring tension drops briefly with increased deflection, rather than a steady increase in force on the spring with increased deflection. Once in the position of over center deflection, it is difficult for the spring to rebound or flip back rapidly. Such a slow response and the load versus deflection instability are undesirable characteristics of a viscous spring damper.

With particular reference to FIG. 3, an operational curve of the inventions of FIGS. 1 and 2 is shown and particularly illustrates that the undesirable operational characteristics of the shear spring being deflected over center are no longer present. The combination of the flexible side wall and elastomeric particles exhibits a steady increase in load versus deflection. Line 76 represents load versus deflection characteristics of the invention upon compression and line 78 exhibits load versus deflection characteristics upon reflection or rebound.

Experimentally, both the compression and rebound lines of the graph of FIG. 3 are determined to be exponential curves. Therefore, it can be shown that the invention exhibits a constant natural frequency characteristic, independent of the mass supported thereby. The importance of having a constant natural frequency spring damper is that when the spring damper is installed on a vehicle, the ride characteristics will remain the same regardless of how the vehicle is loaded.

Where a selectively pressurizable air chamber is included in the invention, the spring rate, and hence the natural frequency of operation of the invention, can be altered by selective pressurizing of the gas chamber. With reference to FIG. 1, the extent of compression of the spring damper 10 under load can be adjusted by pressure changes in the selectively pressurizable gas chamber 28 or the spring damper chamber 18. However, the addition of gas to the selectively pressurizable gas chamber 28 results in a much greater increase in the natural frequency and spring rate than does the addition of air to the spring damper chamber 18. The addition of air to the gas chamber 28 effectively increases the density of the elastomeric particles 24 in the spring damper chamber 18, since the volume of the spring damper chamber 18 decreases. The addition of air to the spring damper chamber 18 does not change the overall volume of the spring damper chamber 18; hence, the particle density does not change in this case.

For the spiral dry viscous spring damper (FIG. 2) the extent of compression at load, spring rate, and natural frequency can be altered by varying the pressure in the inner chamber 60 of connecting member 56 or by varying the pressure in the selectively pressurizable elastomeric member (not shown).

The invention has been described with reference to the preferred and an alternative embodiment. Obviously, modifications and alterations will occur to others upon a reading and understanding of the specification. It is our intention to include all such modifications and alterations insofar as they come within the scope of the appended claims or the equivalents thereof.

Having thus described our invention, we now claim:

1. A flexible wall spring damper including opposed first and second rigid mounting members interconnected by a flexible side wall for defining a flexible wall spring damper chamber, a plurality of solid essentially incompressible in volume irregular shaped elastomeric particles included in said damper chamber, said plurality of elastomeric particles having particle sizes of 30 mesh or smaller filling said chamber at least to the point wherein under static load said chamber is essentially filled, and a flexible diaphragm connected to said second rigid mounting member, a selectively pressurizable gas chamber is interposed between said second rigid mounting member and said diaphragm, whereby relative movement between said opposed rigid mounting members operates to stress said flexible side wall, vary the volume of said gas chamber, and cause relative interaction between the solid incompressible individual particles thus promoting the desired damping and spring characteristics.

2. The flexible wall spring damper as defined in claim 1 wherein said rigid mounting members include air valves for providing selective gas pressurization to said flexible wall spring damper chamber and said selectively pressurizable gas chamber and said first rigid mounting member includes means for providing elastomeric particles to said flexible side wall chamber and means for filtering the egress of gas from said flexible side wall chamber.

3. The flexible wall spring damper of claim 1 wherein said spring damper chamber further includes an agglomeration inhibitor.

4. The flexible wall spring damper as defined in claim 3 wherein said agglomeration inhibitor is at least one material selected from the group consisting of particulate polytetrafluoroethylene, silica powder and silicone oil.

5. The flexible wall spring damper of claim 1 wherein said spring damper chamber includes said plurality of elastomeric particles sized in aggregation to fill said spring damper chamber upon relative movement between said members to an extent to dispose said members in an equilibrium position upon being subjected to a static load.

6. A spiral dry viscous spring damper including opposed first and second rigid mounting members and a flexible wall connecting member therebetween, said connecting member comprising a first spirally configured tube including a first plurality of tube windings and including a tube inner chamber, a plurality of solid essentially incompressible in volume irregular shaped elastomeric particles are included in said inner chamber, said particles having particle sizes of 30 mesh or smaller substantially filling said tube inner chamber, whereby relative movement between said rigid mounting members operates to stress said spirally configured tube and cause relative interaction between the solid incompressible individual particles thus promoting the desired damping and spring characteristics.

7. The spiral dry viscous spring damper as defined in claim 6 wherein a first end portion and a second end portion of said spiral tube contiguous to said first rigid mounting member and said second rigid mounting member respectively are bonded to said first and said second rigid mounting members and includes port means for supplying said elastomeric particles to said tube and selective gas pressurization to said tube.

8. The spiral dry viscous spring damper as defined in claim 6 wherein said plurality of tube windings of said spiral tube are disposed to form a generally cylindrical configuration and bonded together at abutting portions.

9. The spiral dry viscous spring damper as defined in claim 6 wherein a selectively pressurizable elastomeric member is interposed between said mounting members and within said plurality of tube windings, at least one of said mounting members including valve means for pressurizing said elastomeric member.

10. The spiral dry viscous spring damper as defined in claim 9 wherein said selectively pressurizable elastomeric member comprises a second spirally configured tube including a second plurality of tube windings disposed within said first spirally configured tube.

11. A flexible wall spring damper including opposed first and second rigid mounting members interconnected by a flexible side wall for defining a flexible wall spring damper chamber, a plurality of elastomeric solid essentially incompressible in volume irregular shaped particles included in said damper chamber, said plurality of elastomeric particles having particle sizes of 30 mesh or smaller filling said chamber at least to the point wherein under static load said chamber is essentially filled, whereby relative movement between said opposed rigid mounting members operates to stress said flexible side wall and cause relative interaction between the solid incompressible individual particles thus promoting the desired damping and spring characteristics.

12. The flexible wall spring damper as defined in claim 11 wherein one of said rigid mounting members includes an air valve for providing selective gas pressurization to said flexible wall spring damper chamber, means for providing elastomeric particles to said flexible side wall chamber and means for filtering the egress of gas from said flexible side wall chamber.

13. The flexible wall spring damper of claim 11 wherein said spring damper chamber further includes an agglomeration inhibitor.

14. The flexible wall spring damper as defined in claim 13 wherein said agglomeration inhibitor is at least one material selected from the group consisting of particulate polytetrafluoroethylene, silica powder and silicone oil.

15. The flexible wall spring damper of claim 11 wherein said spring damper chamber includes said plurality of elastomeric particles sized in aggregation to fill said spring damper chamber upon relative movement between said members to an extent to dispose said members in an equilibrium position upon being subjected to a static load.

* * * * *